Oct. 30, 1951     O. WICHTERLE     2,573,374
METHOD FOR PRODUCING LACTAMS BY REARRANGEMENT
OF CYCLIC KETOXIMES
Filed Feb. 21, 1948
FIG.1.
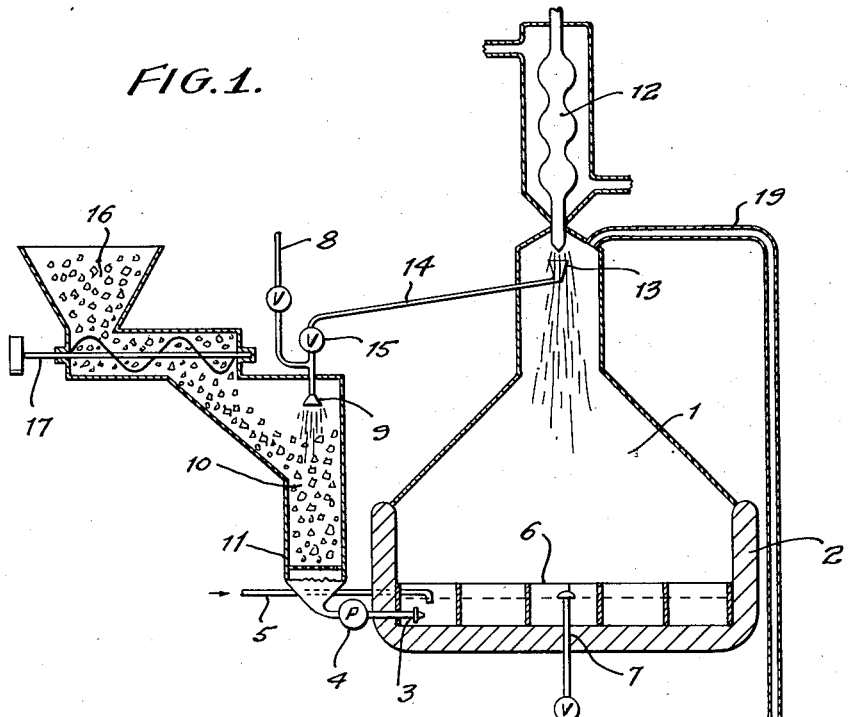
FIG.2.
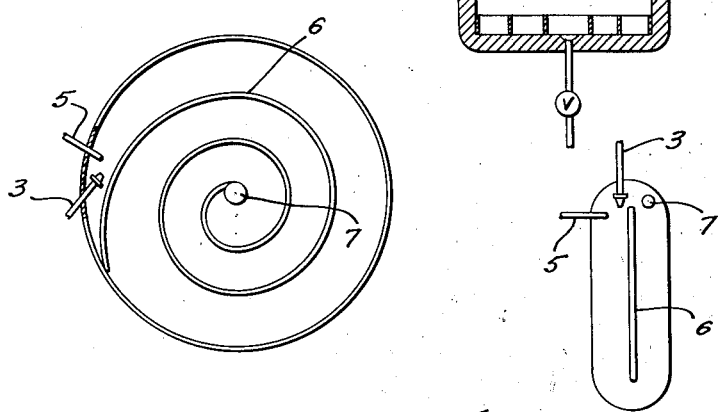
FIG.3.
INVENTOR.
Otto Wichterle
BY Patented Oct. 30, 1951

2,573,374

UNITED STATES PATENT OFFICE 2,573,374

METHOD FOR PRODUCING LACTAMS BY REARRANGEMENT OF CYCLIC KETOXIMES

Otto Wichterle, Prague, Czechoslovakia, assignor to Chemicke zavody na Slovensku, narodny podnik, Bratislava, Czechoslovakia Application February 21, 1948, Serial No. 10,167
In Czechoslovakia March 8, 1946

11 Claims. (Cl. 260—239.3)

Lactams may be prepared by the Beckmann-rearrangement of cyclic ketoximes at elevated temperatures and in the presence of agents, such as concentrated sulphuric acid. This strongly exothermic reaction cannot be easily controlled because of its spontaneous and explosive nature at elevated temperatures, the height of which depends upon the concentration of the sulphuric acid.

Many methods were therefore suggested, in the prior art to render this process commercially feasible and of a continuous nature. One of these suggested methods consists in flowing the two reactants, a cyclic oxime and sulphuric acid either separately or in the form of the sulphuric acid solution of the oxime, into a preheated sulphuric acid solution containing preformed lactam at a regulated rate of speed so as to permit the dissipation of the heat evolved during the rearrangement reaction. The cooling must not be so intensive so as to reduce the temperature below a certain value at which the rearrangement reaction takes place. One of the known methods of externally cooling utilizes a liquid, boiling at an appropriate temperature, in the jacket of the reaction kettle. Another method of cooling consists in mixing the reaction solution directly with the cooling liquid such as acetic acid, the vapors of which are cooled and condensed in a reflux condenser.

The present invention comprises the use of an inert solvent, for the ketoxime which is immiscible with water and sulphuric acid, such as carbon disulphide, a hydrocarbon or a hydrocarbon derivative, and in directing all or a portion of the condensed solvent from the reflux cooler through a device where in the cyclic ketoxime is dissolved, and in further directing such oxime solution into a reaction kettle into which sulphuric acid is introduced simultaneously, the sulphuric acid solution of the lactam being continuously withdrawn at another place of the kettle. Simple or halogenated hydrocarbons, such as benzene, carbon tetrachloride and the like may be successfully used as inert solvents for this purpose.

The use of the inert solvent permits an effective control of the rearrangement reaction thus enabling the production of the lactams on an industrial scale. By using a solvent immiscible with water and sulphuric acid, it is possible to separate the cyclic ketoximes directly from the aqueous mixtures in which they have been formed, thereby dispensing with the necessity of isolating said oximes.

The method according to the invention will be described in form of an example in connection with the accompanying diagrammatic drawing in which Fig. 1 shows a general plan of the apparatus, and Figs. 2 and 3 show two different forms of bottom partition walls.

The proper reaction kettle 1 is provided with a steam jacket 2 and a dispersing nozzle 3 through which the cyclic ketoxime solution in carbon tetrachloride is driven by means of the pump 4. An appropriate hydrate of sulphur trioxide, such as fuming sulphuric acid containing 15% of free $SO_3$, is supplied by means of the pipe 5. The kettle 1 is initially filled with a 20% lactam solution in fuming sulphuric acid containing 1% $SO_3$, to the level represented by the broken line so that the partition wall 6 emerges a bit. The shape of this partition wall which serves to lengthen the course of travel of the reaction liquid is shown in Fig. 2. After having heated the solution in the kettle 1 up to the rearrangement temperature, up to about 60–70° C., the heating is stopped and carbon tetrachloride is led through the pipe 8 and the nozzle 9 over the cyclohexanone oxime situated in the container 10 on a perforated bottom 11, wherein the oxime solution is obtained. The dosing pump 4 forwards the obtained oxime solution through the nozzle 3 into the kettle 1. The finely dispersed oxime begins to rearrange, causing the solvent to boil due to the released heat of the reaction. The vapors of the solvent are condensed in the reflux cooler 12. The funnel 13 leads a part of the condensed solvent through the main 14 into the container 10 wherein the dissolution of a further amount of the oxime takes place.

After having supplied a sufficient amount of carbon tetrachloride through the pipe 8, this pipe is closed and the solvent circulates between the reaction liquid and the reflux cooler 12, the excess solvent overflowing from the funnel 13 directly into the reaction liquid.

The amount of the solvent used for dissolving the oxime may be regulated by means of the control valve 15. By decreasing the amount of solvent flowing through valve 15, the amount of solvent used for direct cooling (the amount overflowing funnel 13 into the reaction vessel) increases simultaneously, so that the differential regulation by means of the valve 15 is a very exact one. The oxime is supplied from the stock container 16 by means of a worm screw 17. The concentration of the solution depends upon the temperature of the solvent so that the process can also be influenced by means of cooling or heating the pipe 14. The reaction product, which is a highly concentrated sulphuric acid solution of the lactam is withdrawn through the overflow-outlet 7 into the kettle 18, the bottom of which is provided with a similar partition wall like the bottom of the kettle 1.

This kettle or container 18 is heated up to 80–85° C. in order to rearrange any traces of the oxime which may be present due to having boiled over partition wall 6 into outlet 7. Simultaneously, any remaining solvent is vaporized, said vapors being led through a thermically isolated pipe 19 into the top of the kettle 1. It is also possible to condense these vapors in a separate cooler and to lead this condensate into the pipe 8.

This invention is not limited to the above described example only. The device may be built in a more simple or in a more complex manner. Any inert fluid which dissolves cyclic oximes, is immiscible with sulphuric acid and water, and boils between 40–160° C. at atmospheric pressure may be used as solvent. Noncorrosive solvents are preferred. The oxime solution may be added directly to the refluxed solvent in order to dilute the oxime before the rearrangement reaction.

The term "the rearrangement temperature" signifies any suitable temperature at which the specific oxime, under given conditions, rearranges instantaneously. This value does not depend only upon the concentration of the hydrate of sulphur trioxide employed, but also depends upon several other factors such as the kind of oxime, its concentration, the apparatus employed, etc. The arrangement of the device itself may be changed in different ways, such as providing the reaction kettle with a stirring device, in order to prevent the separation of the two immiscible liquids into coherent layers by means of virogous stirring, so that the progress of the reaction is entirely isothermic. In this case, the bottom partition wall may be dispensed with or it may be arranged at a suitable height according to the Fig. 3 wherein one or more stirring devices may be arranged in the wide, deep trough. The electric motor driving the worm screw 17 may be switched on at the moment when the weight of the oxime on the perforated bottom 11 falls below a certain value.

What I claim is:

1. A continuous method of producing lactams from cyclic ketoximes which comprises dissolving said ketoxime in an inert solvent having a boiling point between 40° C.–160° C. which is immiscible with water and with sulfuric acid, introducing said ketoxime solution into a preheated solution of sulfuric acid whereby rearrangement to the lactam takes place with the evolution of heat evaporating said inert solvent thereby controlling the heat evolved during the rearrangement reaction, recovering the lactam from the reaction mixture, condensing the vapors of said inert solvent and recycling the condensed solvent to dissolve further quantities of ketoxime.

2. A continuous method of producing caprolactams from cyclohexanone oxime which comprises dissolving said cyclohexanone oxime in an inert solvent having a boiling point between 40° C.–160° C. which is immiscible with water and with sulfuric acid, introducing said cyclohexanone oxime solution into a preheated solution of sulfuric acid whereby rearrangement to the caprolactam takes place with the evolution of heat, evaporating said inert solvent thereby controlling the heat evolved during the rearrangement reaction, recovering the caprolactam from the reaction mixture, condensing the vapors of said inert solvent and recycling the condensed solvent to dissolve further qualities of cyclohexanone oxime.

3. A continuous method of producing lactams from cyclic ketoximes which comprises dissolving said ketoxime in an inert solvent consisting of chlorinated hydrocarbons having a boiling point between 40° C.–160° C. which is immiscible with water and with sulfuric acid, introducing said ketoxime solution into a preheated solution of sulfuric acid whereby rearrangement to the lactam takes place with the evolution of heat, evaporating said inert solvent thereby controlling the heat evolved during the rearrangement reaction, recovering the lactam from the reaction mixture, condensing the vapors of said inert solvent and recycling the condensed solvent to dissolve further quantities of ketoxime.

4. A continuous method of producing lactams from cyclic ketoximes which comprises dissolving said ketoxime in an inert solvent consisting of carbon teterahchloride having a boiling point between 40° C.–160° C. which is immiscible with water and with sulfuric acid, introducing said ketoxime solution into a preheated solution of sulfuric acid whereby rearrangement to the lactam takes place with the evolution of heat, evaporating said inert solvent thereby controlling the heat evolved during the rearrangement reaction, recovering the lactam from the reaction mixture, condensing the vapors of said inert solvent and recycling the condensed solvent to dissolve further quantities of ketoxime.

5. A continuous method of producing lactams from cyclic ketoximes which comprises dissolving said ketoxime in an inert solvent consisting of a hydrocarbon having a boiling point between 40° C.–160° C. which is immiscible with water and with sulfuric acid, introducing said ketoxime solution into a preheated solution of sulfuric acid whereby rearrangement to the lactam takes place with the evolution of heat, evaporating said inert solvent thereby controlling the heat evolved during the rearrangement reaction, recovering the lactam from the reaction mixture, condensing the vapors of said inert solvent and recycling the condensed solvent to dissolve further quantities of ketoxime.

6. A continuous method of producing caprolactams from cyclohexanone oxime which comprises dissolving cyclohexanone oxime in an inert solvent consisting of chlorinated hydrocarbons having a boiling point between 40° C.–160° C. which is immiscible with water and with sulfuric acid, introducing said cyclohexanone oxime solution into a preheated solution of sulfuric acid whereby rearrangement to the caprolactam takes place with the evolution of heat, evaporating said inert solvent thereby controlling the heat evolved during the rearrangement reaction, recovering the caprolactam from the reaction mixture, condensing the vapors of said inert solvent and recycling the condensed solvent to dissolve further quantities of cyclohexanone oxime.

7. A continuous method of producing caprolactams from cyclohexanone oxime which comprises dissolving cyclohexanone oxime in an inert solvent consisting of carbon tetrachloride having a boiling point between 40° C.–160° C. which is immiscible with water and with sulfuric acid, introducing said cyclohexanone solution into a preheated solution of sulfuric acid whereby rearrangement to the caprolactam takes place with the evolution of heat, evaporating said inert solvent thereby controlling the heat evolved during the rearrangement reaction, recovering the caprolactam from the reaction mixture, condensing the vapors of said inert solvent and recycling the condensed solvent to dissolve further quantities of cyclohexanone oxime.

8. A continuous method of producing caprolactams from cyclohexanone oxime which comprises dissolving cyclohexanone oxime in an inert solvent consisting of hydrocarbon having a boiling point between 40° C.–160° C. which is immiscible with water and with sulfuric acid, introducing said cyclohexanone oxime solution into a preheated solution of sulfuric acid whereby rearrangement to the caprolactam takes place with the evolution of heat, evaporating said inert solvent thereby controlling the heat evolved during the rearrangement reaction, recovering the caprolactam from the reaction mixture, condensing the vapors of said inert solvent and recycling the condensed solvent to dissolve further quantities of cyclohexanone oxime.

9. A continuous method of producing lactams from cyclic ketoximes which comprise dissolving said ketoxime in an inert solvent having a boiling point between 40° C.–160° C. which is immiscible with water and with sulfuric acid, introducing said ketoxime solution into a preheated solution of sulfuric acid whereby rearrangement to the lactam takes place with the evolution of heat, evaporating said inert solvent and simultaneously refluxing a regulated amount of said inert solvent into the reaction mixture thereby controlling the heat evolved during the rearrangement reaction, recovering the lactam from the reaction mixture, condensing the vapors of said inert solvent and recycling the condensed solvent to dissolve further quantities of ketoxime.

10. A continuous method of producing caprolactam from cyclohexanone oxime which comprises dissolving said cyclohexanone oxime in an inert solvent consisting of carbon tetrachloride having a boiling point between 40° C.–160° C. which is immiscible with water and with sulfuric acid, introducing said cyclohexanone oxime solution into a preheated solution of sulfuric acid whereby rearrangement to the caprolactam takes place with the evolution of heat, evaporating said inert solvent and simultaneously refluxing a regulated amount of said inert solvent into the reaction mixture thereby controlling the heat evolved during the rearrangement reaction, recovering the caprolactam from the reaction mixture, condensing the vapors of said inert solvent and recycling the condensed solvent to dissolve further quantities of cyclohexanone oxime.

11. A continuous method of producing caprolactam from cyclohexanone oxime which comprises dissolving said cyclohexanone oxime in an inert solvent consisting of a hydrocarbon having a boiling point between 40°–160° C. which is immiscible with water and with sulfuric acid, introducing said cyclohexanone oxime solution into a preheated solution of sulfuric acid whereby rearrangement to the caprolactam takes place with the evolution of heat, evaporating said inert solvent and simultaneously refluxing a regulated amount of said inert solvent into the reaction mixture thereby controlling the heat evolved during the rearrangement reaction, recovering the caprolactam from the reaction mixture, condensing the vapors of said inert solvent and recycling the condensed solvent to dissolve further quantities of cyclohexanone oxime.

OTTO WICHTERLE.

REFERENCES CITED

The following references are of record in the file of this patent:

UNITED STATES PATENTS

| Number | Name | Date |
|---|---|---|
| 1,565,249 | Berry | Dec. 15, 1925 |
| 1,603,851 | Lummus | Oct. 19, 1926 |
| 2,221,369 | Cass | Nov. 12, 1940 |
| 2,249,177 | Schlack | July 15, 1941 |
| 2,260,111 | Caldwell | Oct. 21, 1941 |
| 2,313,026 | Schlack | Mar. 2, 1943 |
| 2,351,381 | Wiest | June 13, 1944 |
| 2,369,117 | Carter | Feb. 13, 1945 |
| 2,423,200 | Moncrieff et al. | July 1, 1947 |

FOREIGN PATENTS

| Number | Country | Date |
|---|---|---|
| 237,392 | Switzerland | Aug. 1, 1945 |

OTHER REFERENCES

Combined Intelligence Objectives Sub-Committee Report (Item No. 22; File No. XXVI–53): "Manufacture of Caprolactam, I. G. Farbenindustrie Leunawerke, Merseburg" (Declassified by authority of the Joint Chiefs of Staff in List No. 1, February 1, 1946) 6 pages.